(12) United States Patent
Wei et al.

(10) Patent No.: US 7,602,972 B1
(45) Date of Patent: Oct. 13, 2009

(54) METHOD AND APPARATUS FOR IDENTIFYING WHITE SPACE TABLES WITHIN A DOCUMENT

(75) Inventors: Bryan Z. Wei, Pleasanton, CA (US); Shawn A. Gaither, Raleigh, NC (US)

(73) Assignee: Adobe Systems, Incorporated, San Jose, CA (US)

( * ) Notice: Subject to any disclaimer, the term of this patent is extended or adjusted under 35 U.S.C. 154(b) by 456 days.

(21) Appl. No.: 11/114,698

(22) Filed: Apr. 25, 2005

(51) Int. Cl.
*G06F 15/00* (2006.01)

(52) U.S. Cl. .................. 382/225; 715/247; 715/244; 715/245; 715/227; 382/175; 382/180; 382/170; 382/172; 358/453

(58) Field of Classification Search .............. 382/225, 382/175, 180, 170, 172; 715/518, 509; 358/453
See application file for complete search history.

(56) References Cited

U.S. PATENT DOCUMENTS

| 4,504,969 | A | * | 3/1985 | Suzuki et al. | 382/175 |
|---|---|---|---|---|---|
| 5,075,895 | A | * | 12/1991 | Bessho | 382/175 |
| 5,091,964 | A | * | 2/1992 | Shimomura | 382/174 |
| 5,119,437 | A | * | 6/1992 | Kuwamura et al. | 382/175 |
| 5,191,612 | A | * | 3/1993 | Katsuyama et al. | 382/171 |
| 5,235,653 | A | * | 8/1993 | Nakano et al. | 382/175 |
| 5,384,864 | A | * | 1/1995 | Spitz | 382/174 |
| 5,485,566 | A | * | 1/1996 | Rahgozar | 715/509 |
| 5,572,601 | A | * | 11/1996 | Bloomberg | 382/175 |
| 5,956,422 | A | * | 9/1999 | Alam | 382/181 |
| 6,012,056 | A | | 1/2000 | Menlove | |
| 6,104,835 | A | | 8/2000 | Han | |
| 6,121,963 | A | * | 9/2000 | Ange | 715/202 |
| 6,247,018 | B1 | * | 6/2001 | Rheaume | 707/102 |
| 6,408,093 | B1 | | 6/2002 | Hu et al. | |

(Continued)

OTHER PUBLICATIONS

Yildiz, Burcu, Information Extraction—Utilizing Table Patterns, Aug. 2004, Informatik, pp. 1-4, 36, 47-65.*

(Continued)

*Primary Examiner*—Dough Hutton
*Assistant Examiner*—Nathan Hillery
(74) *Attorney, Agent, or Firm*—Robert C. Kowert; Meyertons, Hood, Kivlin, Kowert & Goetzel, P.C.

(57) ABSTRACT

One embodiment of the present invention provides a system that facilitates detecting white space tables within a document, wherein a white space table is comprised of text arranged in rows and columns, wherein at least some of the rows and columns are separated by bands of white space rather than by lines. The system operates by identifying an area that includes consecutive lines of text objects with an amount of white space between text objects greater than a specified value. Note that a text object is a string of text without an amount of white space greater than the specified value. The system then determines if the text objects on consecutive lines have widths that are within a specified tolerance of each other. If so, the system checks the spaces between the consecutive lines of text objects to determine if they belong to a single white space table or multiple white space tables. The system also checks if the consecutive lines of text objects form a true table by determining if the consecutive lines of text can be organized in a number of rows and columns. Finally, the system creates a new white space table for the area.

20 Claims, 2 Drawing Sheets

U.S. PATENT DOCUMENTS

| | | | |
|---|---|---|---|
| 6,976,266 B1* | 12/2005 | Strong et al. | 715/788 |
| 2001/0044798 A1* | 11/2001 | Nagral et al. | 707/102 |
| 2002/0087573 A1* | 7/2002 | Reuning et al. | 707/102 |
| 2003/0078973 A1* | 4/2003 | Przekop et al. | 709/204 |
| 2003/0097384 A1* | 5/2003 | Hu et al. | 707/514 |
| 2004/0006742 A1* | 1/2004 | Slocombe | 715/513 |
| 2004/0205594 A1* | 10/2004 | Arora et al. | 715/513 |
| 2005/0091251 A1* | 4/2005 | Ramarao | 707/101 |
| 2005/0273573 A1* | 12/2005 | Liu et al. | 711/206 |
| 2006/0155700 A1* | 7/2006 | Dejean et al. | 707/6 |
| 2006/0200751 A1* | 9/2006 | Underwood et al. | 715/501.1 |

OTHER PUBLICATIONS

Tupaj, Scott et al., Extracting Tabular Information From Text Files, 1996, Tufts University, pp. 1-19.*

Pinto, David et al., Table Extraction Using Conditional Random Fields, Aug. 1, 2003, ACM, SIGIR '03, pp. 1-8.*

Yildiz, Burcu, Information Extraction—Utilizing Table Patterns, Aug. 2004, Informatik, pp. 1-65.*

Hu, et al., "Document image layout comparison and classification", Lucent Technologies, Bell Labs.

* cited by examiner

METHOD AND APPARATUS FOR IDENTIFYING WHITE SPACE TABLES WITHIN A DOCUMENT

BACKGROUND

1. Field of the Invention

The present invention relates to electronic documents. More specifically, the present invention relates to a method and an apparatus for identifying white space tables within a document.

2. Related Art

Documents often include numerous formatting types, from plain text, to complex tables, to pictures and multimedia. Moreover, it is common for these documents to include multiple content formats in the same document.

Hence, in order to display documents correctly to a user, the display program needs to know how the content in the document is formatted. Some documents currently use a hierarchy of tag elements to represent the structure of the document, wherein each section of the document is represented by a tag that includes information about the section's content type (for example, whether it is plain text, a table, or any other format.) This becomes especially important if the document is re-flowed to fit a different display size, or is repurposed to a different document format.

Often times, documents are created in one program, and then converted to a new format more suitable for distribution on the Internet. During this conversion process, the converter needs to correctly identify the formatting types within the document. White space tables, which are comprised of text arranged in rows and columns, where the rows and columns are separated strictly by bands of white space rather than horizontal and vertical lines, can be relatively hard to differentiate from other formatting types. If the identification and tagging process does not recognize the white space tables correctly, the tabular information could be reordered or lost when the document is re-flowed or repurposed. For example, after re-flowing the document, white space between columns might disappear and chunks of text might be positioned extremely close to each other without clear bounding space. This can cause various problems for visually-disabled users who might not be able to use the tabular data in a meaningful way. In addition, when repurposed, the text could get rearranged and become unreadable.

Existing methods for detecting white space tables typically employ weighted learning algorithms, which adjust their weights based on detected white space tables. However, they typically do not correctly identify complex white space tables, or the rare cases where the white space tables may be fairly sparse. Often times, existing methods incorrectly identify layout columns as white space table columns.

Hence, what is needed is a method and an apparatus for detecting white space tables without the problems listed above.

SUMMARY

One embodiment of the present invention provides a system that facilitates detecting white space tables within a document, wherein a white space table is comprised of text arranged in rows and columns, wherein at least some of the rows and columns are separated by bands of white space rather than by lines. The system operates by identifying an area that includes consecutive lines of text objects with an amount of white space between text objects greater than a specified value. Note that a text object is a string of text without an amount of white space greater than the specified value. The system then determines if the text objects on consecutive lines have widths that are within a specified tolerance of each other. If so, the system checks the spaces between the consecutive lines of text objects to determine if they belong to a single white space table or multiple white space tables. The system also checks if the consecutive lines of text objects form a true table by determining if the consecutive the lines of text can be organized in a number of rows and columns. Finally, the system creates a new white space table for the area.

In a variation of this embodiment, the system tags the new white space table in a hierarchical representation of the document.

In a variation of this embodiment, the document is an Adobe® Portable Document Format (PDF) document.

In a variation of this embodiment, prior to detecting white space tables within the document, the system opens the document in a document editor. The task of detecting white space tables within the document is subsequently performed by the document editor.

In a variation of this embodiment, the system repurposes the document into a different document format.

In a variation of this embodiment, the system re-flows the document to display on devices with different display properties than a machine on which the document was created.

In a variation of this embodiment, the devices can include a computer system, a personal digital assistant, a cell phone, and an appliance.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Complex White Space Table

Figure 1:
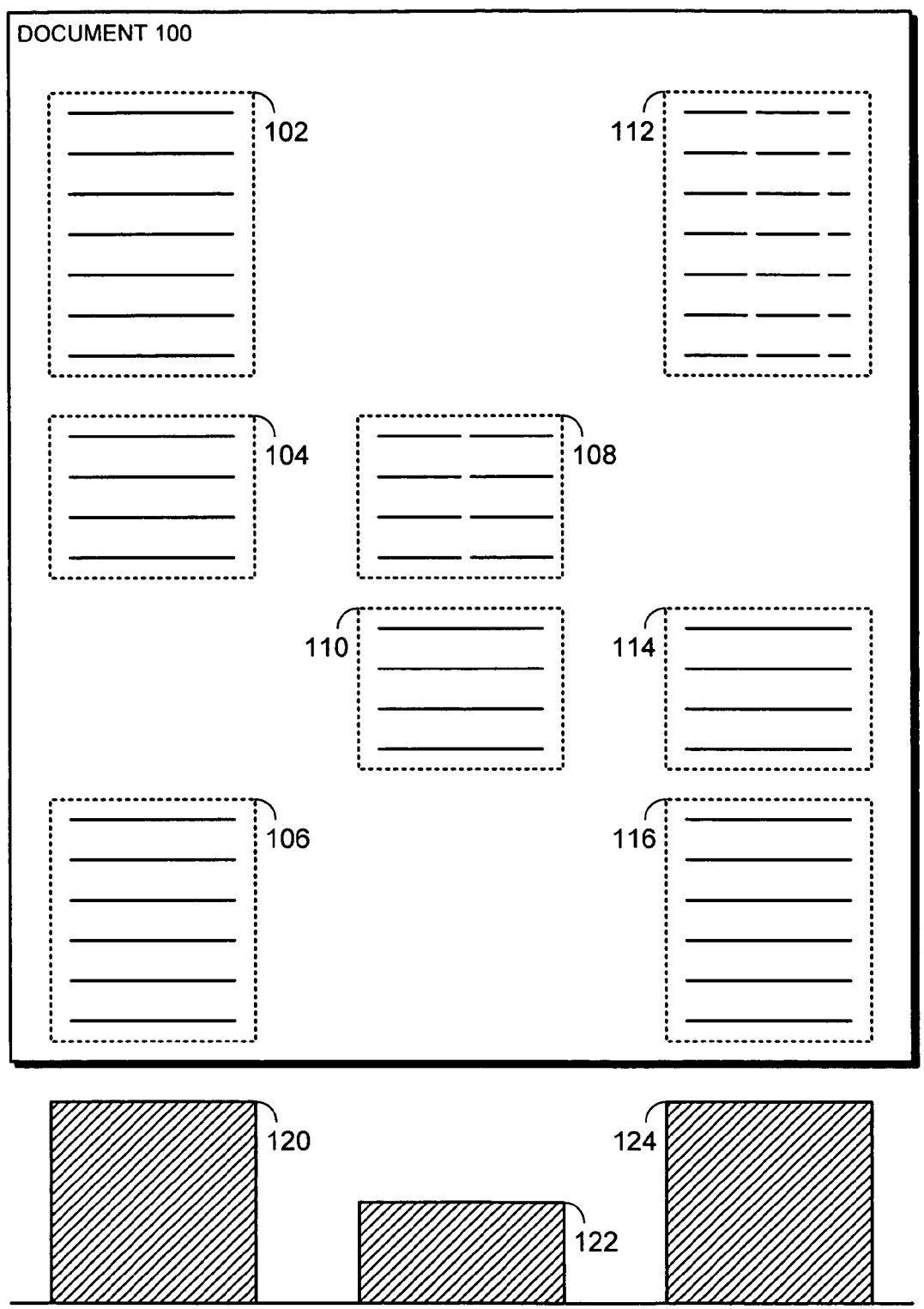
FIG. 1 illustrates a complex white space table in accordance with an embodiment of the present invention.

FIG. 1 illustrates a complex white space table in accordance with an embodiment of the present invention. FIG. 1 includes document 100 which can include any type of document that includes text. In one embodiment of the present invention, document 100 is an Adobe® Portable Document Format (PDF) document.

As illustrated if FIG. 1, document 100 includes multiple text blocks 102-116. Note that the dashed lines do not appear in document 100, but are included to show the boundaries of text blocks 102-116. In this embodiment, text blocks 102-116 form a large white space table that is comprised of three columns and four rows. Moreover, text block 108 is itself a white space table comprised of two columns and four rows. Likewise, text block 112 is also a white space table comprised of three columns and seven rows.

FIG. 1 also includes areas 120-124 which are part of a histogram analyzing data in document 100 on vertical planes. Note that additional histogram analysis on horizontal planes can also be performed, but is not illustrated. Histogram analysis tools can be useful in determining the arrangement of content in columns and rows. For example, the content in document 100 is clearly arranged in three columns as is illustrated by areas 120-124. In addition, by measuring the distance between area 120 and 122, one can determine the spacing between the first two columns in document 100. Use of such histograms is well known to those skilled in the art.

Detecting Complex White Space Tables

Figure 2:
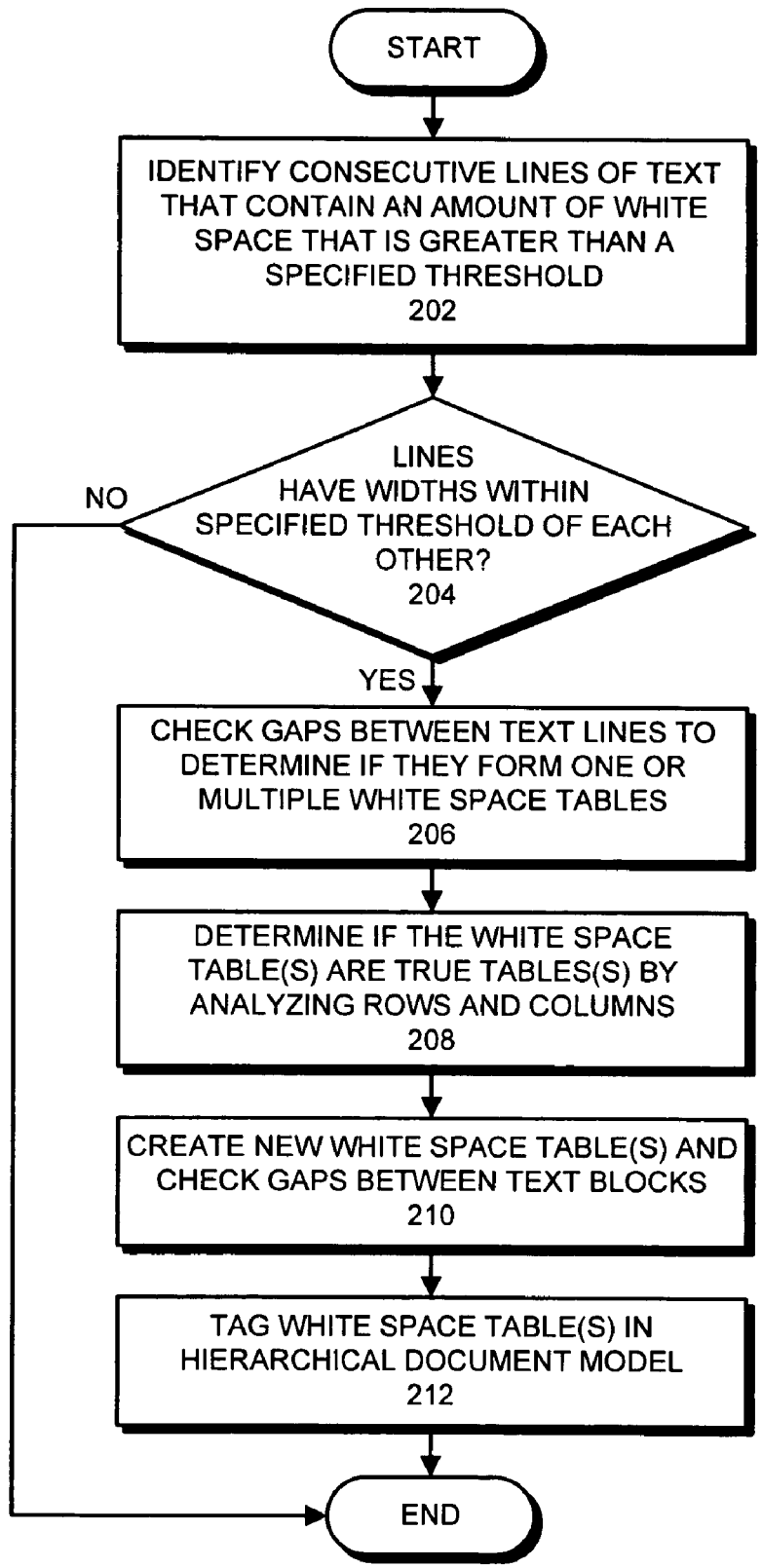
FIG. 2 presents a flowchart illustrating the process of detecting complex white space tables in accordance with an embodiment of the present invention.

FIG. 2 presents a flowchart illustrating the process of detecting complex white space tables in accordance with an embodiment of the present invention. The system starts identifying consecutive lines of text that contain an amount of white space that is greater than a specified threshold (step 202). Next, the system determines if the text lines have widths that are within a specified tolerance of each other (step 204). If so, the system checks the gaps between the text lines to determine if they form one white space table or multiple white space tables (step 206).

Note that the specified threshold, as well as the specified tolerance, may be either pre-determined or calculated by the system for each specific case. For example, if all the text on document 100 has a fairly small point size of 9, one would want a different threshold than in a second example where all of the text has to have a very large point size of 36. The threshold for the first example would likely be one-fourth of that of the second example, although research may show that this is not necessarily a linearly increasing ratio. Furthermore, if document 100 is split into two text regions, a different threshold might be used for each region.

Once the number of white space tables is determined, the system determines if they can be true tables by analyzing the rows and columns (step 208). Finally, the system creates a new white space table for the identified area and puts the lines of text into their appropriate rows and columns and checks the gaps between the text boxes (step 210). The system also tags the white space table in a hierarchical representation of the document to facilitate subsequent reflow or re-purpose operations (step 212).

Note that in some embodiments of the present invention, the system identifies and creates the white space table for immediate use, without tagging the white space table. This is useful in instances where document 100 is repurposed to a format that might not include facilities for tagging document structures. For example, if document 100 is sent through an Optical Character Recognition (OCR) process and output to a plain text file, the tagging step would not be relevant. Plain text files do not have the facilities for any structures except for plain text. During the OCR to plain text repurposing, the system would recreate the table as best as possible using spaces and tabs to align the columns and rows.

By identifying white space tables using the above methods of checking density and distribution of text, column and row heights and widths, and column gaps, the system can correctly detect and identify complex white space tables that were often not detected and identified by prior art methods that analyzed word alignment, text clusters, and text block information.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting white space tables within a document, wherein a white space table is comprised of text arranged in rows and columns, wherein at least some of the rows and columns are separated by bands of white space, the method comprising:

using a computer to perform:
identifying an area that includes consecutive lines of text objects with an amount of white space between text objects on each line greater than a specified value;
in response to determining that the text objects on the consecutive lines in the area have widths that are within a specified tolerance of each other:
checking spaces in the area between the consecutive lines of text objects to determine if the consecutive lines belong to a single white space table or multiple white space tables,
checking if the consecutive lines of text objects in the area form a true table by determining if the consecutive lines of text objects can be organized in a plurality of rows and a plurality of columns, and
dependent upon results of said checking spaces and said checking if the consecutive lines of text objects form a true table, creating at least one new white space table for the area.

2. The method of claim 1, further comprising tagging the new white space table in a hierarchical representation of the document.

3. The method of claim 1, wherein the document is an Adobe® Portable Document Format (PDF) document.

4. The method of claim 1, wherein prior to detecting white space tables within the document, the method further comprises opening the document in a document editor, wherein the task of detecting white space tables within the document is performed by the document editor.

5. The method of claim 1, further comprising repurposing the document into a different document format.

6. The method of claim 1, further comprising re-flowing the document to display on devices with different display properties than a machine on which the document was created.

7. The method of claim 6, wherein the devices can include:
a computer system;
a personal digital assistant;
a cell phone; and
an appliance.

8. A computer-readable storage device storing instructions that when executed by a computer cause the computer to perform a method for detecting white space tables within a document, wherein a white space table is comprised of text arranged in rows and columns, wherein at least some of the rows and columns are separated by bands of white space, the method comprising:

identifying an area that includes consecutive lines of text objects with an amount of white space between text objects on each line greater than a specified value;

in response to determining that the text objects on the consecutive lines in the area have widths that are within a specified tolerance of each other:

checking spaces in the area between the consecutive lines of text objects to determine if the consecutive lines belong to a single white space table or multiple white space tables, checking if the consecutive lines of text objects in the area form a true table by determining if the consecutive lines of text objects can be organized in a plurality of rows and a plurality of columns, and dependent upon results of said checking spaces and said checking if the consecutive lines of text objects form a true table, creating at least one new white space table for the area.

9. The computer-readable storage device of claim 8, wherein the method further comprises tagging the new white space table in a hierarchical representation of the document.

10. The computer-readable storage device of claim 8, wherein the document is an Adobe® Portable Document Format (PDF) document.

11. The computer-readable storage device of claim 8, wherein prior to detecting white space tables within the document, the method further comprises opening the document in a document editor, wherein the task of detecting white space tables within the document is performed by the document editor.

12. The computer-readable storage device of claim 8, wherein the method further comprises repurposing the document into a different document format.

13. The computer-readable storage device of claim 8, wherein the method further comprises re-flowing the document to display on devices with different display properties than a machine on which the document was created.

14. The computer-readable storage device of claim 13, wherein the devices can include:

a computer system;

a personal digital assistant;

a cell phone; and an appliance.

15. An apparatus for detecting white space tables within a document, wherein a white space table is comprised of text arranged in rows and columns, wherein at least some of the rows and columns are separated by bands of white space rather than by lines, comprising a computer-readable storage device storing instructions computer-executable to implement:

an identification mechanism configured to identify an area that includes consecutive lines of text objects with an amount of white space between text objects on each line greater than a specified value;

a determination mechanism configured to determine if the text objects on the consecutive lines in the area have widths that are within a specified tolerance of each other;

a verification mechanism configured to check spaces in the area between the consecutive lines of text objects to determine if the consecutive lines belong to a single white space table or multiple white space tables, wherein the verification mechanism is further configured to check if the consecutive lines of text objects in the area form a true table by determining if the consecutive the lines of text can be organized in a plurality of rows and a plurality of columns, and a creation mechanism configured to create at least one new white space table for the area dependent upon results from said determination mechanism and said verification mechanism.

16. The apparatus of claim 15, further comprising a tagging mechanism configured to tag the new white space table in a hierarchical representation of the document.

17. The apparatus of claim 15, wherein the document is an Adobe® Portable Document Format (PDF) document.

18. The apparatus of claim 15, wherein the apparatus is a document editor.

19. The apparatus of claim 15, further comprising a repurposing mechanism configured to repurpose the document into a different document format.

20. The apparatus of claim 15, further comprising a re-flowing mechanism configured to re-flow the document to display on devices with different display properties than a machine on which the document was created.

\* \* \* \* \*

UNITED STATES PATENT AND TRADEMARK OFFICE
CERTIFICATE OF CORRECTION

PATENT NO.      : 7,602,972 B1                         Page 1 of 1
APPLICATION NO. : 11/114698
DATED           : October 13, 2009
INVENTOR(S)     : Wei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this

Fifth Day of October, 2010

David J. Kappos
*Director of the United States Patent and Trademark Office*